SWEEP LINEARITY CORRECTION SYSTEM

Filed Feb. 20, 1953 2 Sheets-Sheet 1

INVENTOR.
Harry Kihn
BY [signature]
ATTORNEY

Sept. 9, 1958 H. KIHN 2,851,525

SWEEP LINEARITY CORRECTION SYSTEM

Filed Feb. 20, 1953

2 Sheets-Sheet 2

INVENTOR.
Harry Kihn

BY [signature]
ATTORNEY

United States Patent Office 2,851,525
Patented Sept. 9, 1958

2,851,525

SWEEP LINEARITY CORRECTION SYSTEM

Harry Kihn, Lawrenceville, N. J., assignor, by mesne assignments, to the United States of America as represented by the Secretary of the Navy Application February 20, 1953, Serial No. 337,931
3 Claims. (Cl. 178—7.7)

This invention relates to scanning by cathode ray beams and more particularly to the accuracy control of the linearity of scanning.

The television transmission of images in finite detail and discontinuous or limited motion has best been solved by the process of scanning which consists of moving an exploring point over the image to be transmitted in a periodically repeated motion covering the total image area. The exploring point develops an electrical signal which varies in intensity in accordance with the brightness of the elemental image area at the instantaneous position of the exploring point. This signal is then transmitted through normal communication channels to the reproducing station where a like exploring point in the form of a light spot will be scanned in synchronism with exploring point at the transmitter. The brightness of the spot is controlled by the signal. The image scanned at the transmitter is thus reproduced at the receiver.

In order to obtain geometrically accurate and natural proportions in image reproduction, it is necessary that the transmitting and receiving rasters be similar.

Various methods of correcting linearity have been devised, but such methods require in the main mechanical and periodical means for adjusting.

A primary object of this invention is to provide an automatic means for correcting linearity of the exploring point.

Another object of this invention is to provide for a continuous means of adjusting or correcting the linearity of the exploring point.

According to this invention, white light generated by the exploring point of a flying spot scanner is partially extracted by a semi-transparent mirror. The light is made to fall on a grating comprised of vertical lines that reflect one color light and transmit a second color light. The grating also contains tilted horizontal lines that reflect the second color light and transmit the first color light. The signals developed by the vertical lines are used to correct for horizontal linearity and the signals developed by the tilted horizontal lines are used to correct for vertical linearity.

Figures 1, 2, 3:
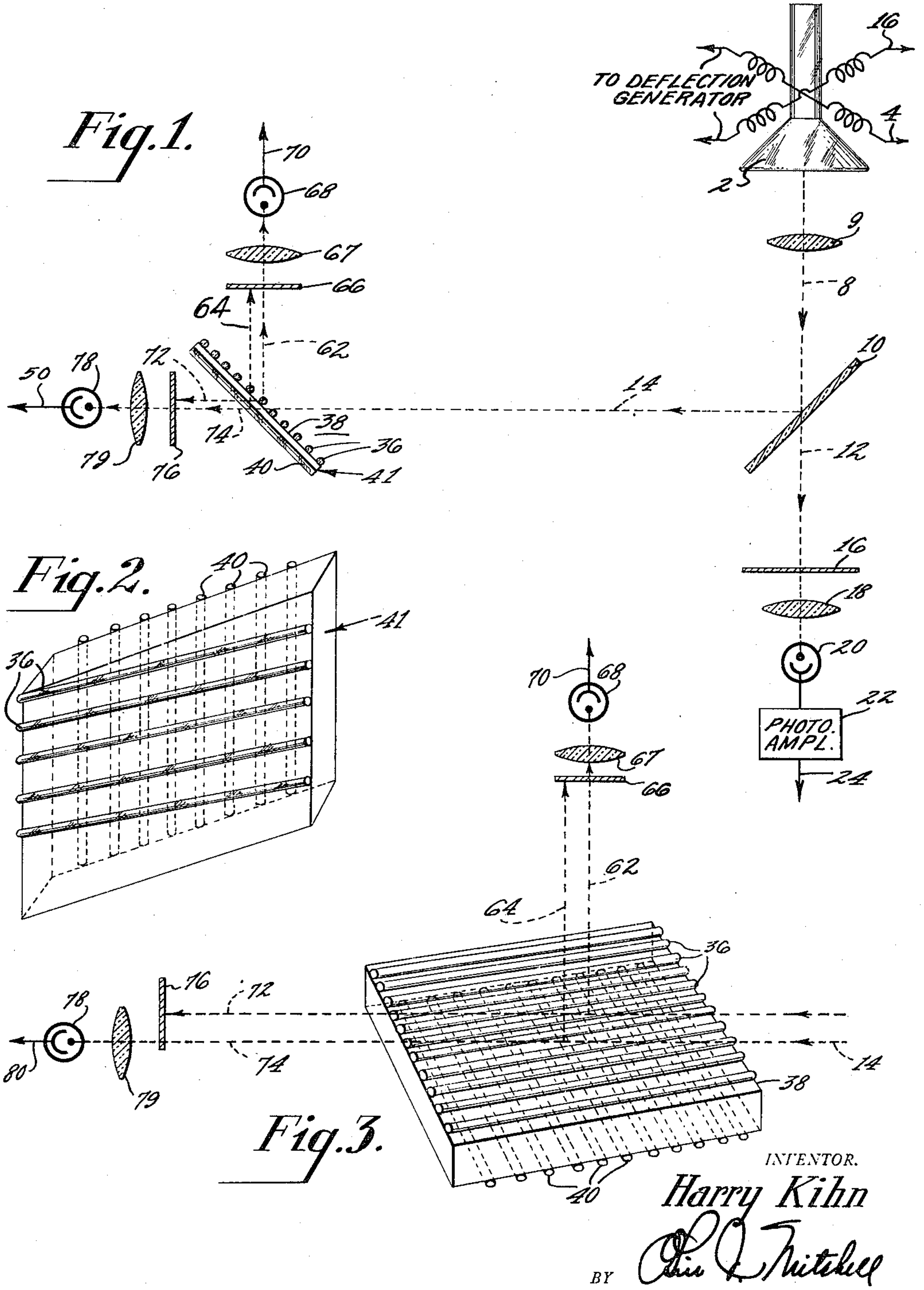
Figure 1 shows one form of this invention.
Figure 2 shows the dichroic grating in detail.
Figure 3 shows how light from the image is divided to form different light paths by means of the dichroic grating.

Turning in more detail to Figure 1, light from a flying spot scanner 2, and its associated deflection coils 4 and 6, generates a light beam 8 through lens 9. Light beam 8 is partially reflected by the partially silvered mirror 10, part of beam 8 going through path 12 to the transparency 16 bearing the image which is to be transmitted. The light is modulated in accordance with the image information on transparency 16. The light beam 8 is imaged by lens 18 upon the photocathode of a photo-cell tube 20. The light variation developed on photo-cell 20, is converted into an electrical signal which is then amplified by amplifier 22 and transmitted.

A portion of the light from the flying spot scanner 2 is reflected by the partially silvered mirror 10 to follow the path 14 and fall upon a dichroic grating 38.

Figure 2 shows dichroic grating 38 in detail and may be referred to in connection with Figure 1. The dichroic grating 38 consists of a number of dichroic strips 36 positioned in a tilted horizontal direction and also a certain number of dichroic strips 40 positioned in the vertical direction. Both the vertical and horizontal strips 36 and 40 are mounted on opposite faces of an optically transparent block 41 whose thickness is small compared to the width of the strips. In the particular form of the invention shown the vertical strips 40 are made of dichroic material having a thickness which transmits blue light but reflects yellow light. The horizontal strips 36 are made of dichroic material of a thickness which reflects blue light and transmits yellow light. The operation of the dichroic grating 38 may best be understood by referring to Figure 3 in connection with Figure 1. Like numbers designate like elements. The white light 14 which strikes the vertical strip 40 breaks up into two light paths. The yellow light follows path 64, and the blue light follows path 74. The path of yellow light 64 is absorbed by blue filter 66 but the path of blue light 74 is transmitted through the blue filter 76 so that a signal results when light in path 74 is imaged upon the photo-cell 78 by lens 79. In a similar manner, white light 14 which also impinges upon the grating 38 at the horizontal strip 36 breaks up into two light paths, but here dichroic strip 36 reflects blue light to path 62 but transmits yellow light 72, so that the blue light in path 62 is transmitted through the blue filter 66 and the yellow light in path 72 is absorbed by blue filter 76.

Figure 4:
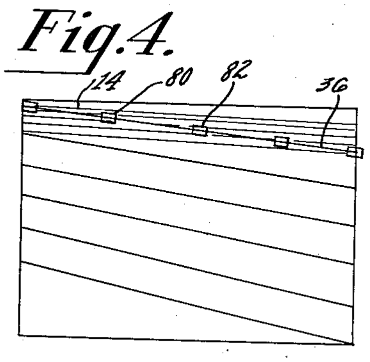
Figure 4 shows the grating with horizontal tilted strips.

Figure 4 shows one view of the grating 38 in which only the tilted horizontal strips 36 are illustrated. The light beam 14, during horizontal scanning in crossing strip 36, generates a light ray at 80. During the next horizontal scan, another light ray 82 is generated so that between any two horizontal strips the number of horizontal scans intersecting any one strip generates that same number of light rays. Therefore, the frequency generated is determined by the number of times each strip is intersected by the horizontal scansion.

Figure 5:
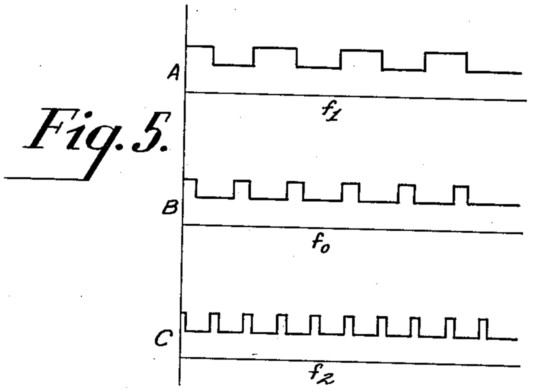
Figures 5 and 6 show graphically the operation of this invention.

The frequency generated is shown in Figure 5, graph B. This indicates the number of light pulses that would be generated if the vertical scanning were perfectly linear, but if the vertical scanning were non-linear, the result would be that the total number of times each strip were intersected by horizontal scanning would be different. For example, in Figure 6, curve 84, the velocity of the scansion beam in the vertical direction is low at the initial portion of the vertical scansion so that a greater number of horizontal scans will be required to intercept each tilted horizontal strip 36. At the top where the initial scansion takes place, more pulses will be generated because there will be a greater number of intersections with the corresponding strips. This would result in a curve similar to curve C of Figure 5. Likewise, referring again to Figure 6, curve 84, it will be seen that during the latter part of the vertical scansion the beam has greater velocity in the vertical direction so that fewer horizontal lines will intersect the horizontal tilted strip 36. The result would be a lower frequency such as that shown in curve A of Figure 5. Therefore, use of the two frequencies generated due to non-linearity can be made to correct the vertical linearity of the scanning beam so that overall vertical linearity may be obtained.

Figure 7:
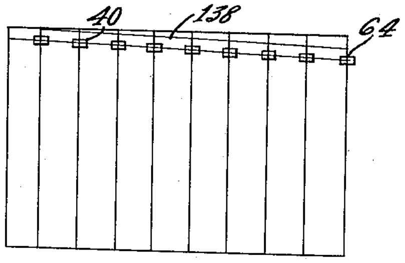
Figure 7 shows the grating with vertical strips.

Referring to Figure 7, only the vertical strips 40 are illustrated. During horizontal scansion the beam impinges upon each dichroic strip 40, generating the light ray 64 which becomes effectively on electrical impulse similar to the type previously discussed in connection with the vertical scansion. However, the frequency generated by such scanning depends upon the velocity of the scansion beam as it passes vertical strips 40. If the velocity of a beam at the initial part of horizontal scansion is low, the rate at which it intersects vertical dichroic strips 40 is low, so that the pulses generated will likewise be of a low repetition frequency similar to that shown in curve A of Figure 5. On the other hand, if the horizontal scansion has a higher velocity than normal, the rate at which it intersects the vertical strips 40 will be higher such as that shown in curve C of Figure 5. Here again, this frequency differential between normal and abnormal can be made use of to correct the linearity of horizontal scansion.

Figure 6:
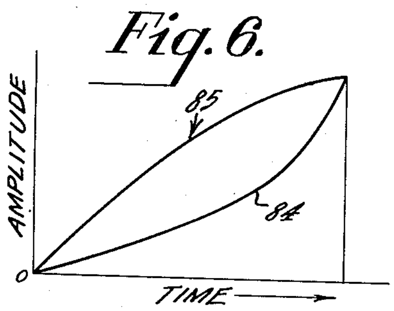

Non-linearity of scanning can be illustrated graphically. Figure 6 illustrates two types of non-linear deflecting voltages which need correction. Curve 85 illustrates a high velocity during the initial part of scansion resulting in an electrical signal whose frequency $f_2$ of curve C of Figure 5 is higher than normal. During the latter part of scansion the velocity is low so that a lower frequency $f_1$ of curve A of Figure 5 would be the result. This pre-supposes that curve 85 represents a vertical deflecting voltage. If curve 85 were a horizontal deflecting voltage, the initial part of curve would result in a higher than normal frequency due to a higher velocity of scansion, and latter portion of curve 85 would result in a lower frequency due to lower velocity of scansion. Curve 84 represents another type of distortion which produces correcting frequencies completely opposite to that produced by scanning non-linearity of the form shown in curve 85. During the initial part of scansion the velocity of the light beam is low and during the latter part of scansion the velocity is high.

Having derived the correcting frequencies, it requires that they be put into such a form by means of adequate circuitry so that they will correct for any non-linearity in the scanning process.

Figure 8:
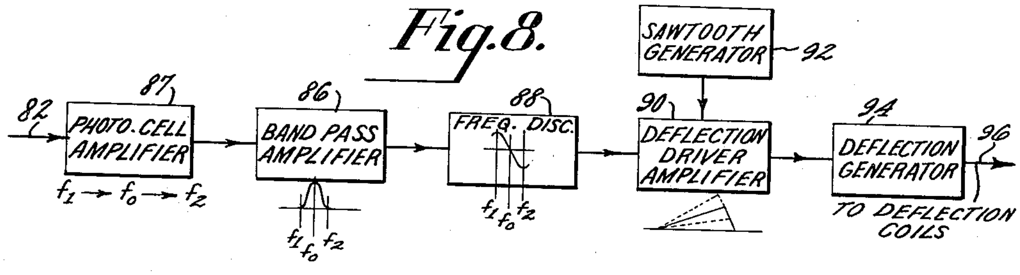
Figure 8 shows circuitry for recovering the frequency variations.

Figure 8 illustrates a means of deriving this correcting voltage from the frequency differentials previously discussed. The electrical signals are fed to an amplifier 87 and passed through a narrow band pass amplifier 86. The band pass amplifier 86 is used to limit the frequencies to only those generated by the dichroic gratings 36 and 40 and to eliminate any other spurious undesired frequency components. The output of this band pass amplifier 86 is then fed to a frequency discriminator 88 of any general or particular type, such as a ratio detector of the type described in an article by Stuart W. Seeley published by "Broadcast News" for January 1946. The output of the frequency discriminator 88 is a direct current signal varying in direct proportion to the frequency differential generated by the non-linear pulses developed by the scanning operation. This varying signal is fed to a deflection driver amplifier 90 which amplifies the level of this voltage variation so that it may be of a suitable amplitude to cause the deflection generator to be properly operated. The deflection generator 92 supplies the normal deflection voltages to the electron beam of the flying spot scanner 2.

Figure 9:
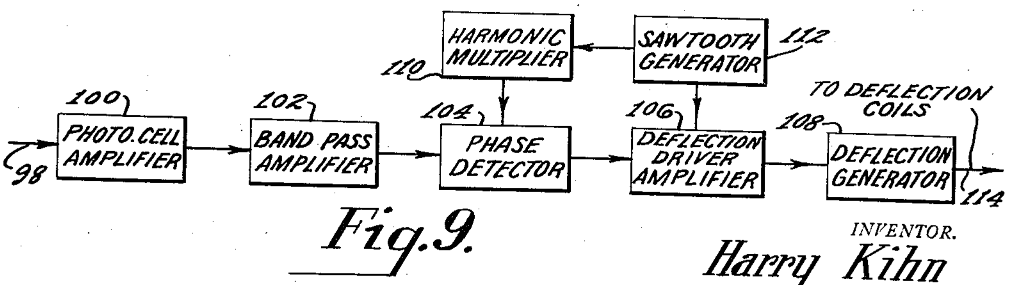
Figure 9 shows another form of the invention wherein variations are converted into the required control voltages.

Figure 9 illustrates another means of recovering a correction voltage due to the frequency variation generated by the non-linear scansion. Instead of using a frequency discriminator as described above, the output of sawtooth generator 112 is fed to a harmonic multiplier 110 which multiplies this frequency to a value in the normal center region shown by curve B of Figure 5. The output of the multiplier 110 is then fed to a phase detector 104 of the type shown in U. S. Patent No. 2,503,700, issued to A. A. Barco on April 11, 1950. The output of band-pass amplifier 102 is the correcting frequency. This correcting frequency is applied to phase detector 104. Both the normal and correcting frequencies are then compared by the phase detector 104 and any difference in these compared frequencies will result in a correcting voltage which will be applied to linearize the flying spot scanning beam as previously indicated.

The optical and circuit arrangements provided may be applied to any deflecting system, be it a single gun or multiple gun affair.

Having described the invention, what is claimed is:

1. In a flying spot scanning system including a kinescope generating a flying light spot and means for deflecting the kinescope beam to cause said generated light spot to trace a predetermined scanning raster, the combination comprising a dichroic grating, means for imaging said light spot scanning raster upon said dichroic grating, said dichroic grating comprising a first plurality of substantially parallel strips disposed in a direction generally corresponding to one of the scanning directions of said scanning raster, the strips of said first plurality being adapted to transmit light of a first predetermined color and to reflect light of a second predetermined color, said dichroic grating further comprising a second plurality of substantially parallel strips disposed in a direction generally corresponding to, but tilted with respect to the other scanning direction of said scanning raster, the strips of said second plurality being adapted to reflect light of said first predetermined color and transmit light of said second predetermined color, first light responsive means disposed in the path of light transmitted by the strips of said first plurality and said second plurality, second light responsive means disposed in the path of light reflected by the strips of said first plurality and said second plurality, a first light filter interposed in the light path between said dichroic grating and said first light responsive means, a second light filter interposed in the light path between said dichroic grating and said second light responsive means, each of said light filters being adapted to selectively pass light of one of said two predetermined colors whereby said first light responsive means selectively responds to raster light intercepted by the strips of a predetermined one of said strip pluralities and said second light responsive means selectively responds to raster light intercepted by the strips of the other of said strip pluralities, each of said light responsive means generating a signal pulse in response to each interception of raster light by the strips of the appropriate plurality, means coupled to said first light responsive means and responsive to the frequency of the pulses generated thereby for developing a first deflection correcting signal, means coupled to said second light responsive means and responsive to the frequency of the pulses generated thereby for developing a second deflection correcting signal, and means for applying said correcting signals to said kinescope beam deflecting means.

2. Apparatus in accordance with claim 1 wherein the strips of said first plurality are substantially perpendicular with respect to the horizontal scanning direction of said scanning raster, the strips of said second plurality are disposed generally parallel to, but at a relatively small predetermined angle to said horizontal scanning direction, and wherein said first correcting signal is utilized to linearize the scanning of said kinescope beam in the horizontal scanning direction and said second correcting signal is utilized to linearize the scanning of said kinescope beam in the vertical scanning direction.

3. Apparatus in accordance with claim 2 wherein each of said correction signal developing means comprises a frequency discriminator.

References Cited in the file of this patent

UNITED STATES PATENTS

| | | |
|---|---|---|
| 2,415,059 | Zworykin | Jan. 28, 1947 |
| 2,476,698 | Clapp | July 19, 1949 |
| 2,545,325 | Weimer | Mar. 13, 1951 |
| 2,552,070 | Sziklai | May 8, 1951 |
| 2,621,244 | Landon | Dec. 9, 1952 |